(No Model.)

J. DAIN, Jr.
RAKE TOOTH.

No. 479,789. Patented Aug. 2, 1892.

Witnesses:
John L. Jackson.
Nellie McKibben.

Inventor:
Joseph Dain Jr.
by Bond, Adams & Pickard
Attorneys.

UNITED STATES PATENT OFFICE.

JOSEPH DAIN, JR., OF CARROLLTON, MISSOURI.

RAKE-TOOTH.

SPECIFICATION forming part of Letters Patent No. 479,789, dated August 2, 1892.

Application filed February 23, 1892. Serial No. 422,426. (No model.)

*To all whom it may concern:*

Be it known that I, JOSEPH DAIN, Jr., a citizen of the United States, residing at Carrollton, in the county of Carroll and State of Missouri, have invented certain new and useful Improvements in Rake-Teeth, of which the following is a specification, reference being had to the accompanying drawings, in which—

Figure 1:
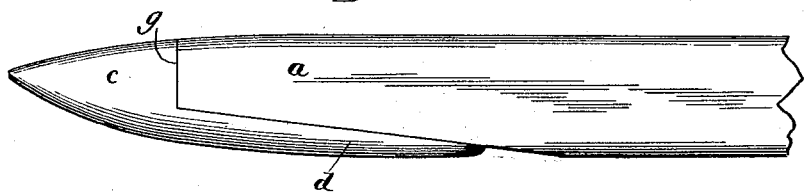
Figure 2:
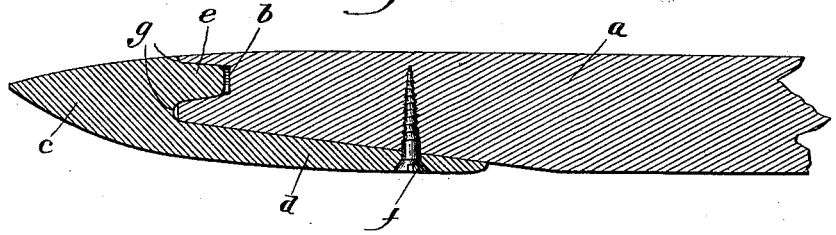

Figure 1 is a side elevation, and Fig. 2 is a central longitudinal vertical section.

My invention relates to teeth for rakes and particularly to that class of teeth used on some kinds of horse hay-rakes.

As heretofore constructed, the teeth in rakes of this class have been provided with metallic points or ferrules to serve as protection for the ends of the teeth, and the construction heretofore employed has been to tenon the end of the wooden tooth to fit into a socket formed in the metal point. The point was then secured upon the end of the tooth by screws or in some similar manner. As in rakes of this description the point is generally lower than the rear end of the tooth, when working in wet weather or with wet hay the water will run down the tooth and into the socket in the point, where it cannot escape, and consequently cause the end of the wooden tooth to rot very rapidly. If the wood of the tooth is green when fitted into the socket in the point, it will shrink on becoming dry or seasoned and the point will work loose.

The objects of my invention are to provide a tooth the point of which will be so constructed and secured upon it that water cannot collect between the end of the tooth and the point, thereby greatly lengthening the life of the tooth; also, to provide suitable means for securing the point upon the tooth, whereby it cannot work loose, and to cheapen the manufacture of teeth of this description. I accomplish these objects as hereinafter specified, and as illustrated in the drawings. That which I regard as new will be pointed out in the claim.

In the drawings, $a$ indicates the tooth, which is provided on its front end with a socket $b$.

$c$ indicates the tooth-point, which is pointed at its forward end and beveled, as shown, and is provided with a rearwardly-extending piece $d$ and a conical dowel $e$, located above the piece $d$ and projecting from a substantially flat surface $g$, arranged vertically at the rear of the tooth-point to bear snugly against the end of the rake-tooth, as shown in Fig. 2. The dowel $e$ is adapted to fit snugly into the socket $b$ in the tooth $a$, as shown in Fig. 2, and the piece $d$ is adapted to fit snugly against one side of the tooth $a$.

$f$ indicates a screw, which passes through the piece $d$ and is screwed into the tooth $a$, as shown in Fig. 2.

In the manufacture of my improved tooth the socket $b$ is bored in the end of the tooth $a$ and the point $c$ is then forced upon the end of the tooth by suitable mechanism, preferably screw-pressure, the dowel $e$ fitting tightly into the socket $b$. Sufficient pressure is applied to jam the rear edges of the point tightly against the forward edges of the tooth, so as to close up the seam between the two. The screw $f$ is then inserted, and the point thereby firmly held upon the tooth. By this construction the accumulation of water in the socket $b$ is prevented, as even if any water should get in between the point $c$ and the tooth $a$ it cannot get into the socket $b$, owing to the downward inclination of the tooth, and consequently the tooth is prevented from rotting. Should the tooth $a$ be green when the dowel $e$ is inserted in the socket $b$, the shrinking of the tooth will act to hold the dowel more firmly in the socket, and it therefore cannot work loose.

By constructing the point as above described it is also practicable to make the point of cast-iron, while with the ordinary point having a socket to receive the end of the tooth it has been necessary to make the point of wrought or malleable iron to prevent breakage of the point when the tooth is wedged into it firmly. My construction is therefore much cheaper than constructions heretofore used.

That which I claim as my invention, and desire to secure by Letters Patent, is—

As a new article of manufacture, a rake-tooth point having a substantially flat surface arranged vertically at the rear and adapted to fit snugly against the end of the rake-tooth, a projecting piece adapted to fit against one side of the rake-tooth for securing the point to the tooth, and a conical dowel projecting from said flat surface and adapted to fit into a suitable recess in the rake-tooth, whereby the greater part of the surface of the tooth will remain uncovered and the accumulation of water around the end of the tooth and consequent decaying of the tooth will be prevented, substantially as described.

JOSEPH DAIN, JR.

Witnesses:
JOHN L. JACKSON,
CHARLES E. PICKARD.